A. BROUGHTON.

POLISHING STONES, METALS, &c.

No. 350.

Reissued Feb. 12, 1856.

UNITED STATES PATENT OFFICE.

ALBERT BROUGHTON, OF MALONE, NEW YORK.

IMPROVEMENT IN POLISHING STONE, METALS, &c.

Specification forming part of Letters Patent No. 11,886, dated November 7, 1854; antedated October 24, 1854; Reissue No. 350, dated February 12, 1856.

*To all whom it may concern:*

Be it known that I, ALBERT BROUGHTON, of Malone, in the county of Franklin and State of New York, have invented a new and improved method of polishing the surfaces of any and all materials that are susceptible of receiving a polish, such as stone, metal, &c.; and I do hereby declare that the following is a full and exact description thereof, reference being had to the accompanying drawings, making a part of this specification—

Figure 1:
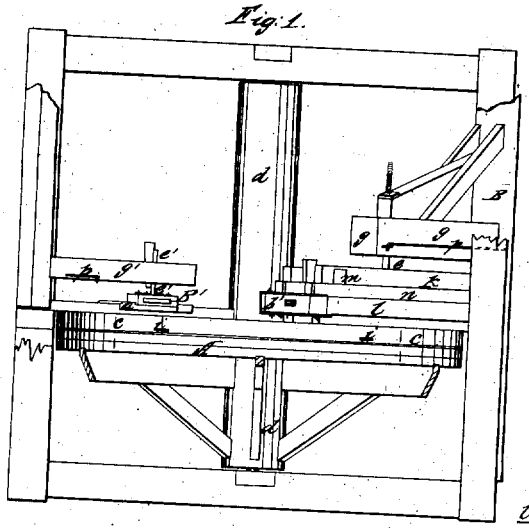
Figure 2:
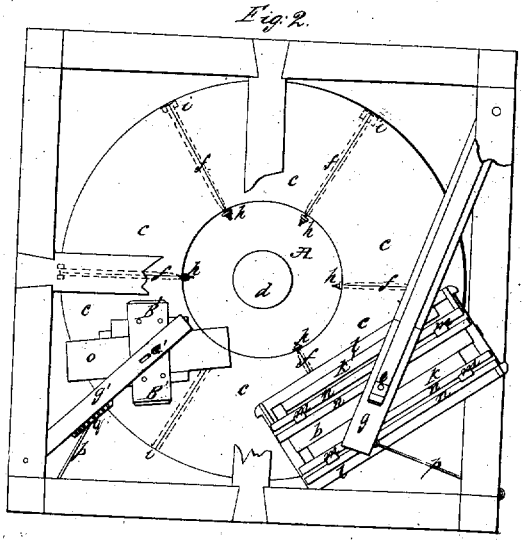

Figure 1 being an elevation of the machine employed in my improved polishing process; Fig. 2, a plan with some of the parts removed, and Figs. 3, 4, 5, 6, and 7 are views showing various parts of the machine in detail.

Similar letters indicate like parts in all the figures.

The nature of my invention consists in polishing the surfaces of various substances by means of a horizontal rotating plane, of stone or other suitable material, arranged with apparatus for holding the substances whose surfaces are to be polished in such a manner that the polishing friction exerted by the said rotating plane upon the surfaces of said substances will cause them to rotate upon central steadying pivots or axles, substantially as hereinafter set forth.

The polishing-plane employed by me I usually construct of stone segments *c c*, placed upon and properly secured to a wooden wheel, A, which is immovably secured in a horizontal position to a vertical shaft, *d*, that is supported in suitable bearings and driven by any power that may be thought most expedient.

Figure 6:
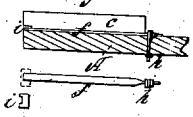

Fig. 6 shows the manner of bedding, securing, and adjusting the stone segments *c c* to each other and to the wheel A—viz., the segments rest upon tension-bars *f f*, which are placed under their angles. The outer ends of said bars are turned up against the outer surfaces of the segments or against plates *i i*, which are let into recesses in the segments. The inner extremities of the said bars have screws formed upon them, which pass through staples *h h*, whose shanks are let into the wheel A. Nuts placed upon the screws at the ends of said tension-bars bear against the inner sides of the staples *h h* as they are turned, and consequently draw the tension-bars inward, and thereby so act upon the segments as to closely and securely unite them to each other and to the wheel A, and in such a manner that they can be adjusted to a true circular-shaped plane whose center is the axis of motion, and also in such a manner that any one of the said segments can readily be withdrawn and replaced by another.

The frames for holding the various articles during the polishing process may be of such a shape as to best adapt them to the reception of the peculiar shape of the pieces operated upon. Each of said supporting-frames has a spindle, *e*, passing into an aperture in its center, which spindle descends from a crane, *g*, or other equivalent device, arranged in such a position that the polishing-friction exerted upon the article or articles placed in said frame will impart a rotary motion to the frame and the article or articles placed therein.

Figure 4:
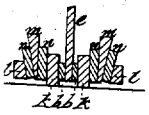
Figure 3:
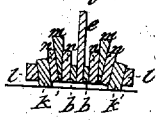
Figure 7:
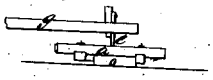
Figure 5:
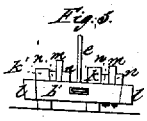

A frame, *b b′ l l*, for securing flat stones in proper positions for polishing their edges, either beveling or at right angles to their sides, is shown in Figs. 1, 2, 3, and 4. Fig. 3 shows the arrangement of the parts *m n n* of said frame for securing a couple of flat stones, *k′ k′*, in a position for polishing their oblique edges, and Fig. 4 represents the respective parts of said frame in a position for polishing the right-angular edges of the stones *k k*. Fig. 5 is an end view of the said frame *b b′ l l*, representing the stone *k′* in a position for polishing its oblique edge and the stone *k* in a position for polishing its right-angular edge; but I find that when thus arranged the action is not so perfect as when the stones are arranged in the manner represented by Figs. 3 and 4, for the reason that the surfaces to be polished should be distributed as near as possible equdistant from the axis of the receiving-frame, for the purpose of causing the polishing-friction to impart a rotary motion to said frame. The spindle *e*, which passes into or through the aforesaid frame *b b′ l l*, descends from the crane *g*, which projects from the pivoted post B and is properly secured by braces. The said frame is retained in a proper position upon the polishing-plane by means of the brace *p*. The spindle *e* may be secured to the supporting-frame in such a manner that the frame and its contents can be swung onto or off from the polisher by means of the crane *g*; or a separate crane may be employed for that purpose, and the crane *g* and spindle *e* be employed merely for pivoting the said frame during the process of polishing.

In Figs. 1 and 2, B′ represents a frame for holding a flat stone, *o*, in a position for polishing one of its sides, together with the spindle *e′*, crane *g′*, and brace *p*, for retaining said stone in the proper position.

In my practical experiments in the polishing of articles I have found that when either the articles operated upon or the polishing-surface employed is allowed to remain stationary, or nearly so, it is impossible to produce a smooth surface, for the reason that the cutting material used in said process will gather into ridges, and when a merely rotary motion is employed for producing the polishing friction creases will be formed in the surfaces of the articles very similar in appearance to those produced by the action of a circular saw in soft wood; but by employing a rotating polishing-plane and placing the articles to be polished in pivoted frames so arranged that the polishing friction will cause the articles operated upon to rotate around the axis of their receiving-frames, a perfectly smooth and straight surface is invariably produced.

In putting my improved polishing process in practice I find that when the cutting material becomes unequally distributed upon the polishing-surface it will cause the articles operated upon to rotate in a reverse direction to that of the polisher until the said cutting material has been properly distributed by the said reverse movements, and as soon as this has been effected the said articles will again resume their usual movements in harmony with the movement of the rotating polishing-plane. It will therefore be perceived that this self-regulating movement of each of the articles operated upon is indispensably necessary to the production of perfectly smooth or polished surfaces. Should the said articles be made to rotate by mechanical means entirely independent of the rotating polishing-surface, there would be a total want of harmony between the said articles and the rotating polisher, which would produce an unequal distribution of the cutting material, and also an inequality between the sliding and the rotary action upon the surfaces of the articles operated upon, which would render it impossible to reduce said surfaces to a smooth or a highly-polished condition. I am therefore satisfied that such a method of producing polished surfaces can never be successfully put in practice.

What I claim as my invention, and desire to secure by Letters Patent, is—

The within-described polishing process—viz., a process by which the friction of the surface of the rotating polishing-wheel upon the surfaces of the articles operated upon will impart rotary movements to said articles substantially in the manner and for the purpose herein set forth.

ALBERT BROUGHTON.

Witnesses:
Z. C. ROBBINS,
JOHN BAILEY.